(12) United States Patent
Sampath (10) Patent No.: US 8,457,265 B2
(45) Date of Patent: Jun. 4, 2013

(54) METHOD AND APPARATUS FOR GENERATING COEFFICIENTS IN A MULTI-INPUT-MULTI-OUTPUT (MIMO) SYSTEM

(75) Inventor: Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1378 days.

(21) Appl. No.: 11/843,823

(22) Filed: Aug. 23, 2007

(65) Prior Publication Data
US 2009/0052514 A1 Feb. 26, 2009

(51) Int. Cl.
*H04B 1/10* (2006.01)

(52) U.S. Cl.
USPC ............ 375/350; 375/232; 375/346; 375/349

(58) Field of Classification Search
USPC ................. 375/130, 140, 147–148, 229–232, 375/259, 285, 316, 346, 347, 349, 350
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 2002/0161560 | A1 | 10/2002 | Abe et al. | |
| 2004/0059551 | A1 | 3/2004 | Nishiyama | |
| 2006/0029149 | A1 | 2/2006 | Kim et al. | |
| 2006/0285531 | A1* | 12/2006 | Howard et al. | 370/343 |
| 2007/0230382 | A1* | 10/2007 | Ding et al. | 370/310 |
| 2008/0118008 | A1* | 5/2008 | Kotecha | 375/340 |

FOREIGN PATENT DOCUMENTS

| | | |
|---|---|---|
| CN | 1613202 A | 5/2005 |
| CN | 1918872 A | 2/2007 |
| JP | 2002135171 A | 5/2002 |
| JP | 2005237033 A | 9/2005 |

OTHER PUBLICATIONS

Szczecinki, L et al.: "Low complexity adaptation of MIMO MMSE receivers, implementation aspects" Global Telecommunications Conf, 2005. ISBN: 978-0-7803-9414-8.*
Benesty, J. et al.: "A fast recursive algorithm for optimum sequential signal detection in a blast system" 2003 IEEE International Conference on Acoustics, Speech, and Signal Processing. Proceedings. (ICASSP). Hong Kong, April 6-10, 2003; [IEEE International Conference on Acoustics, Speech, and Signal Processing (ICASSP)], New York, NY : IEEE, US, vol. 51, Apr. 6, 2003, XP010639218 ISBN: 978-0-7803-7663-2.
Jiansong, C. et al.: "Fast receive antenna selection for MIMO systems" Signals, Systems and Computers, 2004. Conference Record of the Thirty-Eighth Asilomar Conference on Pacific Grove, CA, USA Nov. 7-10, 2004, Piscataway, NJ, USAJEEE, vol. 2, Nov. 7, 2004, pp. 1777-1780, XP010781180 ISBN: 978-0-7803-8622-8.

(Continued)

*Primary Examiner* — Shuwang Liu
*Assistant Examiner* — James M Perez
(74) *Attorney, Agent, or Firm* — Stanton Braden (57) ABSTRACT

SIC equalizer coefficients for multiple layers are concurrently generated in a manner that reduces computational overhead and complexity. If number of transmit antennas ($M_T$) used exceeds two, matrix inverse(s) are generated by using a modified version of Riccatti Recursion. While producing an inverse matrix using this technique, for an N layer matrix (N being an integer>2), inverse matrixe(s) for layers less than N are also concurrently produced—thus, eliminating the requirement of producing inverse an matrix for each respective layer separately.

24 Claims, 7 Drawing Sheets

OTHER PUBLICATIONS

Ortigueira, Manuel D.: "A new algorithm for the factorization and inversion of recursively generated matrices" Signal Processing, Elsevier Science Publishers B.V. Amsterdam, NL, vol. 52, No. 1, Jul. 1, 1996, pp. 65-73, XP004008758 ISSN: 0165-1684.

Szczecinski, L. et al.: "Low complexity adaptation of MIMO MMSE receivers, implementation aspects" Global Telecommunications Conference, 2005. Globecom 05. IEEE St. Loius, MO, USA Nov. 28-Dec. 2, 2005, Piscataway, NJ, USAJEEE, vol. 4, Nov. 28, 2005, pp. 2327-2332, XP010879560 ISBN: 978-0-7803-9414-8.

International Search Report and Written Opinion—PCT/US2008/074100—ISAEPO-2009-02-02.

Taiwan Search Report—TW097132457—TIPO—Oct. 14, 2012.

* cited by examiner

METHOD AND APPARATUS FOR GENERATING COEFFICIENTS IN A MULTI-INPUT-MULTI-OUTPUT (MIMO) SYSTEM

BACKGROUND

I. Field

The following description relates generally to wireless communications, and more particularly to schemes for generating equalizer coefficients in a MIMO system.

II. Background

Wireless communication systems are widely deployed to provide various types of communication content such as for example voice, media, data, and so on. These systems may be multiple-access systems capable of supporting communication with multiple users by sharing available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, 3GPP2 UMB systems, and orthogonal frequency division multiple access (OFDMA) systems.

An orthogonal frequency division multiple access (OFDMA) system utilizes orthogonal frequency division multiplexing (OFDM). OFDM is a multi-carrier modulation technique that partitions overall system bandwidth into multiple (N) orthogonal frequency subcarriers. These subcarriers may also be called tones, bins, and frequency channels. Each subcarrier is associated with a respective sub carrier that may be modulated with data. Up to N modulation symbols may be sent on the N total subcarriers in each OFDM symbol period. These modulation symbols are converted to the time-domain with an N-point inverse fast Fourier transform (IFFT) to generate a transformed symbol that contains N time-domain chips or samples.

In a frequency hopping communication system, data is transmitted on different frequency subcarriers in different time intervals, which may be referred to as "hop periods". These frequency subcarriers may be provided by orthogonal frequency division multiplexing, other multi-carrier modulation techniques, or some other constructs. With frequency hopping, the data transmission hops from subcarrier to subcarrier in a pseudo-random manner. This hopping provides frequency diversity and allows data transmission to better withstand deleterious path effects such as narrow-band interference, jamming, fading, and so on.

An OFDMA system can support multiple mobile stations concurrently. For a frequency hopping OFDMA system, data transmission for a given mobile station may be sent on a "traffic" channel that is associated with a specific frequency hopping (FH) sequence. This FH sequence indicates the specific subcarrier to use for data transmission in each hop period. Multiple data transmissions for multiple mobile stations may be sent concurrently on multiple traffic channels associated with different FH sequences. These FH sequences may be defined to be orthogonal to one another so that only one traffic channel, and thus only one data transmission, uses each subcarrier in each hop period. By using orthogonal FH sequences, multiple data transmissions generally do not interfere with one another while enjoying benefits of frequency diversity.

Generally, a wireless multiple-access communication system can concurrently support communication for multiple wireless terminals. Each terminal communicates with one or more base stations via transmissions on forward and reverse links. The forward link (or downlink) refers to a communication link from base stations to terminals, and the reverse link (or uplink) refers to a communication link from terminals to base stations. This communication link may be established via a single-input-single-output (SISO), multiple-input-single-output (MISO), single-input-multiple-output (SIMO) or a multiple-input-multiple-output (MIMO) system.

A MIMO system employs multiple ($N_T$) transmit antennas and multiple ($N_R$) receive antennas for data transmission. A MIMO channel formed by $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that a reciprocity principle allows estimation of the forward link channel from the reverse link channel. This enables an access point to extract and transmit beamforming gain on the forward link when multiple antennas are available at the access point.

A conventional MIMO wireless system has 2 modes of operation—single code word (SCW) and multiple-code word (MCW). In MCW mode, for each tone the transmitter can encode data transmitted on each spatial layer independently, possibly with different rates. The receiver employs a successive interference cancellation (SIC) algorithm and can employ a low complexity linear receiver such as minimum mean-squared error (MMSE) receiver or a zero-forcing (ZF) receiver, or non-linear receivers, for each tone.

MIMO design requires use of MMSE equalizers at the receiver to separate MIMO spatial multiplexing streams. The MMSE equalization consists of (a) Equalizer coefficient computation (b) SINR and bias computation for each data symbol; and (c) Demodulation of data symbols. For a conventional receiver, equalizer coefficients are generated for each SIC layer by separately computing individual matrix inverses. This can increase computational complexity of an SIC receiver. Thus, there exists a need in the art for a system and/or methodology that automatically generates SIC equalizer coefficients for multiple layers, with minimal overhead in complexity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with systems and methods described herein SIC equalizer coefficients are concurrently generated for multiple layers in a manner that reduces computational overhead and complexity as compared to conventional schemes. Depending on number of transmit antennas ($M_T$) used, matrix inverse(s) can be performed by using a modified version of Riccatti Recursion for systems with more than 2 transmit antennas ($M_T > 2$). While producing an inverse matrix using this technique, for an N layer matrix (N being an integer>2), inverse matrix(s) for layers less than N are also concurrently produced—thus, eliminating the requirement of producing inverse an matrix for each respective layer separately.

In accordance an aspect, method generates equalizer coefficients for plurality of layers concurrently by computing one matrix inverse.

In another aspect, a receiver concurrently generates equalizer coefficients for all layers by computing just one matrix inverse.

In accordance with an aspect, a method in a wireless communication system comprises: receiving a data transmission; selecting a recursive scheme for generating equalizer coefficients to separate the received data transmission; and generating the equalizer coefficients for a plurality of layers concurrently by using the selected recursive scheme.

In yet another aspect, an apparatus operable in a wireless communication system, comprises means for receiving a data transmission; means for selecting a recursive scheme to generate equalizer coefficients which separate the received data transmission; and means for generating the equalizer coefficients for plurality of layers concurrently by using the selected recursive scheme.

In still yet another aspect, a computer program product, comprises: a computer readable medium comprising computer executable code for causing at least one computer to carrying out the following acts: receiving a data transmission; selecting a recursive scheme for generating equalizer coefficients to separate the received data transmission; and generating the equalizer coefficients for plurality of layers concurrently by using the selected recursive scheme.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Artificial intelligence (AI) can be employed to identify a specific context or action, or generate a probability distribution of specific states of a system or behavior of a user without human intervention. Artificial intelligence relies on applying advanced mathematical algorithms—e.g., decision trees, neural networks, regression analysis, cluster analysis, genetic algorithm, and reinforced learning—to a set of available data (information) on the system or user.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Figure 1:
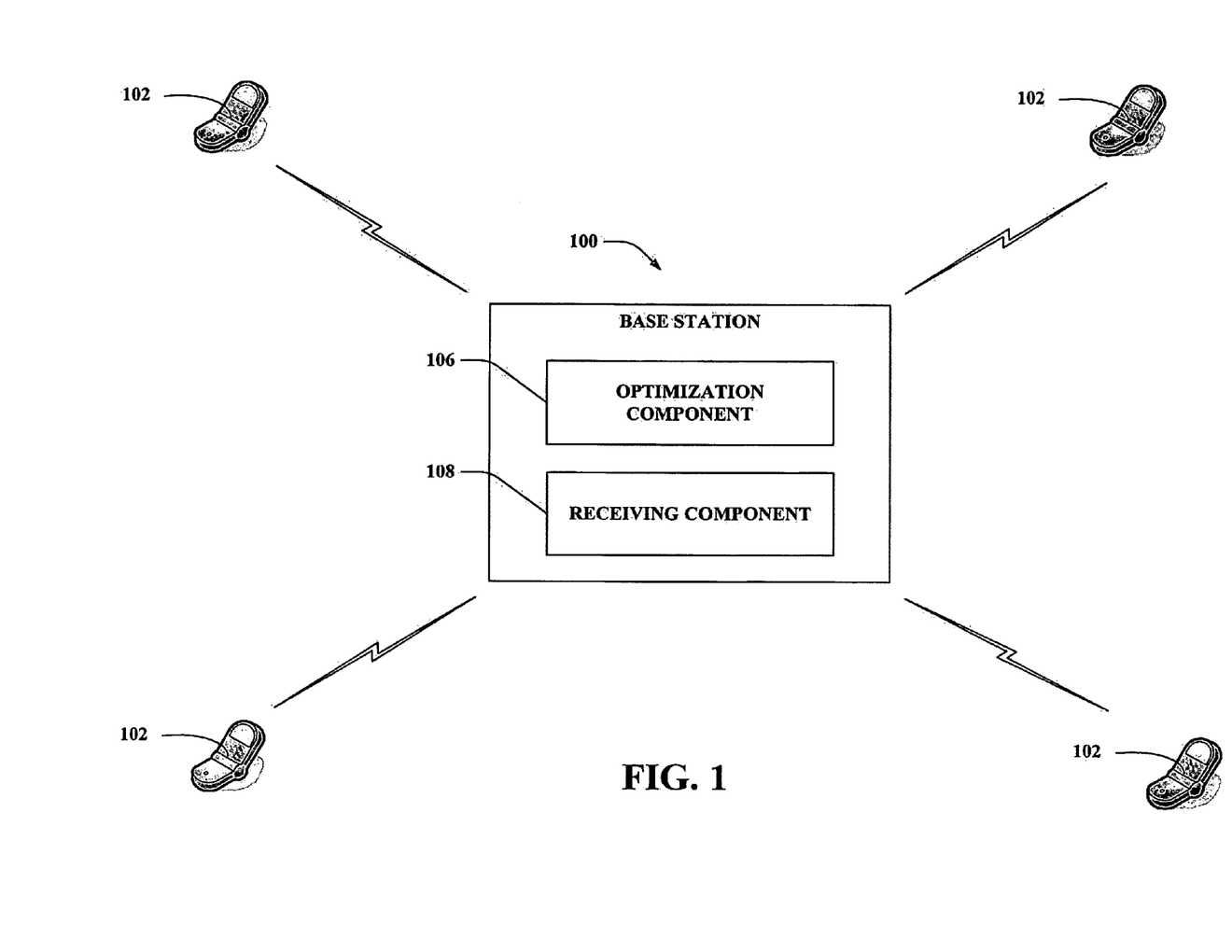
FIG. 1 is an illustration of an example system that effectuates optimal downlink transmission in a wireless communication environment.

Referring now to FIG. 1, a system 100 that effectuates optimal downlink transmission in a wireless communication environment is illustrated in accordance with various embodiments herein. Base station 102 is configured to communicate with one or more mobile devices 104. Base station 102 is comprised of an optimization component 106 that allows for multiplexing of localized and distributed transmissions, and a receiving component 108 that, for example, receives information regarding base station capabilities. Optimization component 106 allows for downlink transmission such that frequency diversity is achieved and overhead costs associated with the transmission are mitigated via various schemes, as discussed infra. As can be appreciated, multiplexing of localized and distributed transmissions allows for accommodation of various traffic services, user abilities and further allows a user of the one or more mobile devices 104 to take advantage of channel properties.

Moreover, for example, the one or more mobile devices 106 can provide the optimization component 106 at the base station 102 with information related to mobile device capabilities, an estimate of downlink channel conditions, and subscriber data. It is also to be appreciated that the base station 102 can determine percentage of high speed versus low speed users, store subscriber data and information related to mobile device capabilities. Such capabilities of base station 102 can further allow optimization component 108 to choose the optimal multiplexing scheme according to surrounding conditions.

Optimization component 106 can be employed in connection with making determinations or inferences regarding optimization decisions and the like. Optimization component 106 can employ a probabilistic-based or statistical-based approach, for example, in connection with making determinations or inferences. The inferences can be based in part upon explicit training of classifier(s) (not shown) before employing the system, or implicit training based at least upon previous, or current actions, commands, instructions, and the like during use of the system.

Optimization component 106 can employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Methods also include methods for capture of logical relationships such as theorem provers or more heuristic rule-based expert systems. Inferences derived from such learned or manually constructed models can be employed in optimization techniques, such as linear and non-linear programming, that seek to maximize some objective function.

The optimization component 106, can take into consideration historical data, and data about current context. Policies can be employed that consider including consideration of the cost of making an incorrect determination or inference versus benefit of making a correct determination or inference. Accordingly, an expected-utility-based analysis can be used to provide inputs or hints to other components or for taking automated action directly. Ranking and confidence measures can be calculated and employed in connection with such analysis.

It should be appreciated that optimization is dynamic and policies selected and implemented will vary as a function of numerous parameters; and thus the optimization component 106 is adaptive.

Figure 2:
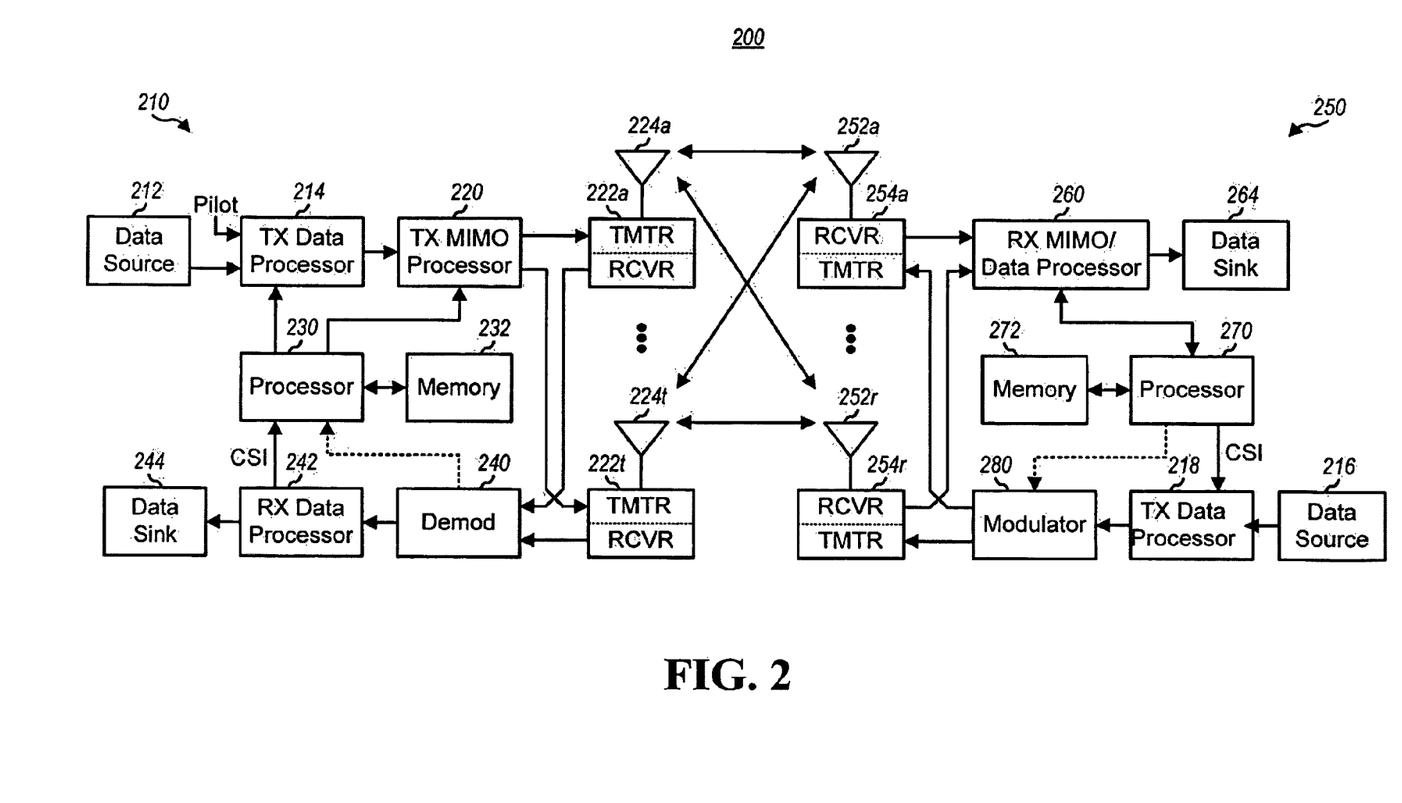
FIG. 2 illustrates a block diagram of an embodiment of a transmitter system and a receiver system in a multi-input multi-output multiple access wireless communication system according to an embodiment.

Referring to FIG. 2, a block diagram of an embodiment of a transmitter system 210 and a receiver system 250 in a MIMO system 200 is illustrated. At transmitter system 210, traffic data for a number of data streams is provided from a data source 212 to transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed on provided by processor 230.

The modulation symbols for data streams are then provided to a TX processor 220, which may further process the modulation symbols (e.g., for OFDM). TX processor 220 then provides $N_T$ modulation symbol streams to $N_T$ transmitters (TMTR) 222a through 222t. Respective transmitter(s) 222 receive and process a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 218 is complementary to that performed by TX processor 220 and TX data processor 214 at transmitter system 210.

RX processor 260 may derive an estimate of the channel response between the $N_T$ transmit and $N_R$ receive antennas, e.g., based on the pilot information multiplexed with the traffic data. RX processor 260 may identify the pilot symbols according to pilot patterns stored in memory, e.g., memory 272 that identify the frequency subcarrier and symbol period assigned to each pilot symbol. In addition, the user specific and sector specific scrambling sequences may be stored in memory so that they may be utilized by RX processor 260 to multiple the received symbols so that the proper decoding can occur.

To decode the pilot and data symbols during handoff, the RX processor 260 and processor 270 may separately extract the pilot symbols from each sector that uses one of the pilot patterns assigned for handoff. The pilot symbols, and associated data symbols, that are transmitted according one of the pilot patterns assigned for handoff are decoded for each sector and may then be combined from all of the sectors. The combining may be performed, as previously stated, by utilizing maximum ratio combining (MRC) or other known techniques.

The channel response estimate generated by RX processor 260 can be used to perform space, space/time processing at the receiver, adjust power levels, change modulation rates or schemes, or other actions. RX processor 260 can further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides channel state information (CSI), which may comprise various types of information regarding the communication link and/or the received data stream. For example, the CSI may comprise only the operating SNR. The CSI is then processed by a TX data processor 272, modulated by a modulator 280, conditioned by transmitters 254a through 254r, and transmitted back to transmitter system 210.

In addition, the SNR estimates can be utilized to determine location of a mobile station, which is transmitting pilot symbols, within a cluster of a cell or a cell. This information then can be utilized to determine a pilot pattern to assign to the mobile station. In some embodiments, memories 232 and 272 may contain identifiers that correspond to the different pilot patterns that can be utilized within the wireless communication systems. The memories can identify the pilot patterns based upon whether they are to be used for handoff or if the location of the mobile station indicates that it is near a cell or sector boundary. The pilot patterns may also have the same pilot symbol locations but have user specific and/or sector specific scrambling sequences, depending on how the different pilot patterns are distinguished from each other. These identifiers can then be transmitted from the transmitter to the receiver and then utilized by the receiver to modulate the pilot symbols according to the identified pilot pattern.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported CSI is then provided to processor 230 and used to (1) determine the data rates and coding and modulation schemes to be used for the data streams and (2) generate various controls for TX data processor 214 and TX processor 220.

Processors 230 and 270 direct operation at the transmitter and receiver systems, respectively. Memories 232 and 272 provide storage for program codes and data used by processors 230 and 270, respectively. The memories 232 and 272 store the pilot patterns in terms of cluster locations, user specific scrambling sequences, sector specific scrambling sequences, if utilized, and cell specific scrambling sequences, if utilized.

Processors 230 and 270 then can select which of the pilot patterns, user specific scrambling sequences, sector specific scrambling sequences, and cell specific scrambling sequences are to be utilized in transmission of the pilot symbols.

At the receiver, various processing techniques can be used to process the $N_R$ received signals to detect $N_T$ transmitted symbol streams. These receiver processing techniques can be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 2 discusses a MIMO system, the same system can be applied to a multi-input single-output system where multiple transmit antennas, e.g., those on a base station, transmit one or more symbol streams to a single antenna device, e.g., a mobile station. Also, a single output to single input antenna system may be utilized in the same manner as described with respect to FIG. 2.

According to an aspect, a MIMO system equation is as follows:

$$x_k = H_k s_k + v_k$$

The following terms define elements of the equation:
k: Tone Index
$H_k$: $M_R \times M_T$ channel matrix
$S_k$: $M_T \times 1$ vector of transmit symbols
$X_k$: $M_R \times 1$ received vector
$V_k$: $M_R \times 1$ receiver noise vector
$N_d$: Num. of OFDM data tones
$N_f$: Num. of OFDM symbols per Frame
$N_u$: Num. of Equalizer updates per Frame (across tones and OFDM symbols).

In an aspect, MMSE equalization can be done with or without interference nulling. Interference nulling is viable in block-hopping, where spatial covariance matrix of the interference. for example, is constant over an 8×16 tile consisting of 8 tones and 16 OFDM symbols, and can be readily estimated. For symbol rate hopping, interference statistics change over frequency (tones) and OFDM symbols, and hence cannot be readily estimated. Hence, interference nulling is not a viable option for symbol-rate hopping.

The MMSE equalization consists of: (a) Equalizer coefficient computation; (b) SINR and bias computation for each data symbol; and (c) Demodulation of data symbols.

According to an aspect, the receiver for an access terminal comprises method(s) for equalizer computation ($M_T \times M_R$) for symbol rate hopping that is performed per OFDMA tone as follows:

$$G_k = [H_k^* H_k + \sigma^2 I]^{-1} H_k^*$$

where $\sigma^2$ is the interference/noise variance per receiver antenna. The $M_T \times M_T$ MMSE matrix inverse to be computed is of the form: $P_k = [H_k^* H_k + \sigma^2 I]^{-1}$ Depending on number of transmit antennas ($M_T$) used, a matrix inverse can be performed by using a modified version of Riccatti Recursion for systems with more than 2 transmit antennas ($M_T > 2$). In an aspect, upon registration with a serving access point, the receiver can receive system parameters or separated transmission indicating number of antennas used by a transmitter.

According to an aspect, the matrix inverse is evaluated using a first modified Riccatti recursion algorithm/scheme for symbol rate hopping. The $M_T \times M_T$ is defined as:

$$P_{|ik} = \left[ \sum_{j=1}^{i} h_{jk}^* h_{jk} + \sigma^2 I \right]^{-1},$$

where $h_{jk}$ is the j-th row of $H_k$.

Using the matrix inversion Lemma, the recursion may be employed as, i=1, 2 ... $M_R$, wherein $$P_{|ik} = P_{|i-1,k} - \frac{P_{|i-1,k} h_{ik}^* h_{ik} P_{|i-1,k}}{1 + h_{ik} P_{|i-1,k} h_{ik}^*}$$

$$P_{|0} = \frac{1}{\sigma^2} I_{M_T \times M_T}$$

For each iteration according to an aspect, the operations and the associated complexity can be written as: $1^{st}$ Iteration:

| | |
|---|---|
| $\bar{a} = P_{\|i-1} h_i^*$: | $2M_T$ RM |
| $b = h_i P_{\|i-1} h_i^* = h_i \bar{a}$: | $4M_T$ RM, $2M_T$ RA, $2(M_T - 1)$ RAcc |
| $\alpha = 1/(1+b)$: | Table-lookup reciprocal |
| $\bar{c} = \alpha \bar{a} = \frac{P_{\|i-1} h_i^*}{1 + h_i P_{\|i-1} h_i^*}$: | $2M_T$ RM |
| $\overline{cc^*} = \frac{P_{\|i-1} h_i^* h_i P_{\|i-1}}{1 + h_i P_{\|i-1} h_i^*}$: | $2M_T(M_T + 1)$ RM |
| $P_{\|i}$ update: | $2M_T$ RA |

$2^{nd}$ Iteration Onwards:

| | |
|---|---|
| $\bar{a} = P_{\|i-1} h_i^*$: | $4M_T^2$ RM, $2M_T^2$ RA, $2M_T(M_T - 1)$ RAcc |
| $b = h_i P_{\|i-1} h_i^* = h_i \bar{a}$: | $4M_T$ RM, $2M_T$ RA, $2(M_T - 1)$ RAcc |
| $\alpha = 1/(1+b)$: | Table-lookup reciprocal |
| $\bar{c} = \alpha \bar{a} = \frac{P_{\|i-1} h_i^*}{1 + h_i P_{\|i-1} h_i^*}$: | $2M_T$ RM |
| $\overline{cc^*} = \frac{P_{\|i-1} h_i^* h_i P_{\|i-1}}{1 + h_i P_{\|i-1} h_i^*}$: | $2M_T(M_T + 1)$ RM |
| $P_{\|i}$ update: | $2M_T^2$ RA |

It should be noted that after $M_R$ iterations, $P_k \leftarrow P_{|MR,k}$ is obtained. For example, while producing an inverse matrix using this technique, such as for example an N layer matrix (N being an integer>2), inverse(s) for layers less than N are also produced—thus, eliminating the requirement of producing the inverse matrix for each respective layer separately.

According to another aspect, a second modified Riccatti recursive method for equalizer computation of block-hopping with interference-nulling is performed as follows:

$$C_k = [H_k H_k^* + R_{nn}]^{-1}$$

The inverse $C_k$ is computed using another version of the Riccatti recursion algorithm. For example:

$$C_{|ik} = \left[ \sum_{j=1}^{i} h_{jk} h_{jk}^* + R_{nn} \right]^{-1},$$

where $h_{jk}$ is the j-th column of $H_k$

Using the matrix inversion Lemma, the recursion may be employed as, i=1, 2 ... $M_T$, wherein $$C_{|i,k} = C_{|i-1,k} - \frac{C_{|i-1,k} h_{ik} h_{ik}^* P_{|i-1,k}}{1 + h_{ik}^* P_{|i-1,k} h_{ik}}$$

$$C_{|0} = R_{nn}^{-1}$$

For each iteration, the operation and the associated complexity can be written as:
$1^{st}$ Iteration:

| | |
|---|---|
| $\bar{a} = C_{\|i-1} h_i$: | |
| $b = h_i^* C_{\|i-1} h_i = h_i^* \bar{a}$: | $2M_R$ RM, $M_R$ RA, $(M_R - 1)$ RAcc |
| $\alpha = 1/(1+b)$: | Table-lookup reciprocal |
| $\bar{c} = \alpha \bar{a} = \frac{C_{\|i-1} h_i}{1 + h_i^* C_{\|i-1} h_i}$: | $2M_R$ RM |
| $\overline{ca^*} = \frac{C_{\|i-1} h_i h_i^* C_{\|i-1}}{1 + h_i^* C_{\|i-1} h_i}$: | $2M_R(M_R + 1)$ RM |
| $P_{\|i}$ update: | |

$2^{nd}$ Iteration Onwards:

| | |
|---|---|
| $\bar{a} = C_{\|i-1} h_i$: | $4M_R^2$ RM, $2M_R^2$ RA, $2M_R(M_R - 1)$ RAcc |
| $b = h_i^* C_{\|i-1} h_i = h_i^* \bar{a}$: | $4M_R$ RM, $2M_R$ RA, $2(M_R - 1)$ RAcc |
| $\alpha = 1/(1+b)$: | Table-lookup reciprocal |
| $\bar{c} = \alpha \bar{a} = \frac{C_{\|i-1} h_i}{1 + h_i^* C_{\|i-1} h_i}$: | $2M_R$ RM |
| $\overline{ca^*} = \frac{C_{\|i-1} h_i h_i^* C_{\|i-1}}{1 + h_i^* C_{\|i-1} h_i}$: | $2M_R(M_R + 1)$ RM |
| $P_i$ update: | $2M_R^2$ RA |

It should be noted that after $M_T$ iterations, $C_k \leftarrow C_{|MT,k}$ is obtained. For example, while producing inverse matrix using this technique, for a 4 layer matrix, inverse for layers less then 4 are also concurrently produced, thus, eliminating the need to generate the inverse matrix for each layer separately.

According to an aspect, a MMSE receiver generates equalizer coefficient(s) for a plurality of layers concurrently by computing a one matrix inverse using the modified versions of Riccatti recursion scheme for symbol rate hopping and block-hopping with interference-nulling. By employing this method, a receiver can be made using fewer components, such as adders and multipliers. As a result of using fewer adders and multipliers, receiver power consumption and hardware real estate can be reduced as compared to conventional schemes.

It is to be appreciated that a hybrid approach employing a conventional recursion scheme can be employed with modified recursion schemes as provided herein. Accordingly, the optimization component 106 can perform a utility-based analysis to weigh power savings, processing capabilities, resources, etc. versus memory utilization (e.g., since coefficients are often stored by the modified recursion schemes), and switch between schemes in connection with calculating inverse matrices.

Moreover, it is to be appreciated that base stations (e.g., using spatial division multiple access (SDMA), or any suitable multiple access system) in the reverse link where separation of numerous users becomes a computationally expensive problem can employ aspects described herein. Likewise, it should be appreciated that the features described herein are not limited to MIMO systems, but rather can be employed in connection with systems that involve generating multiple matrix inverses (e.g., equalization systems, array processing, matrix array processing, sensor networks, signal processing, image processing, filtering, transforms, quantization . . . ).

Methodologies relating to deriving equalizer coefficient are now described and illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Figure 3:
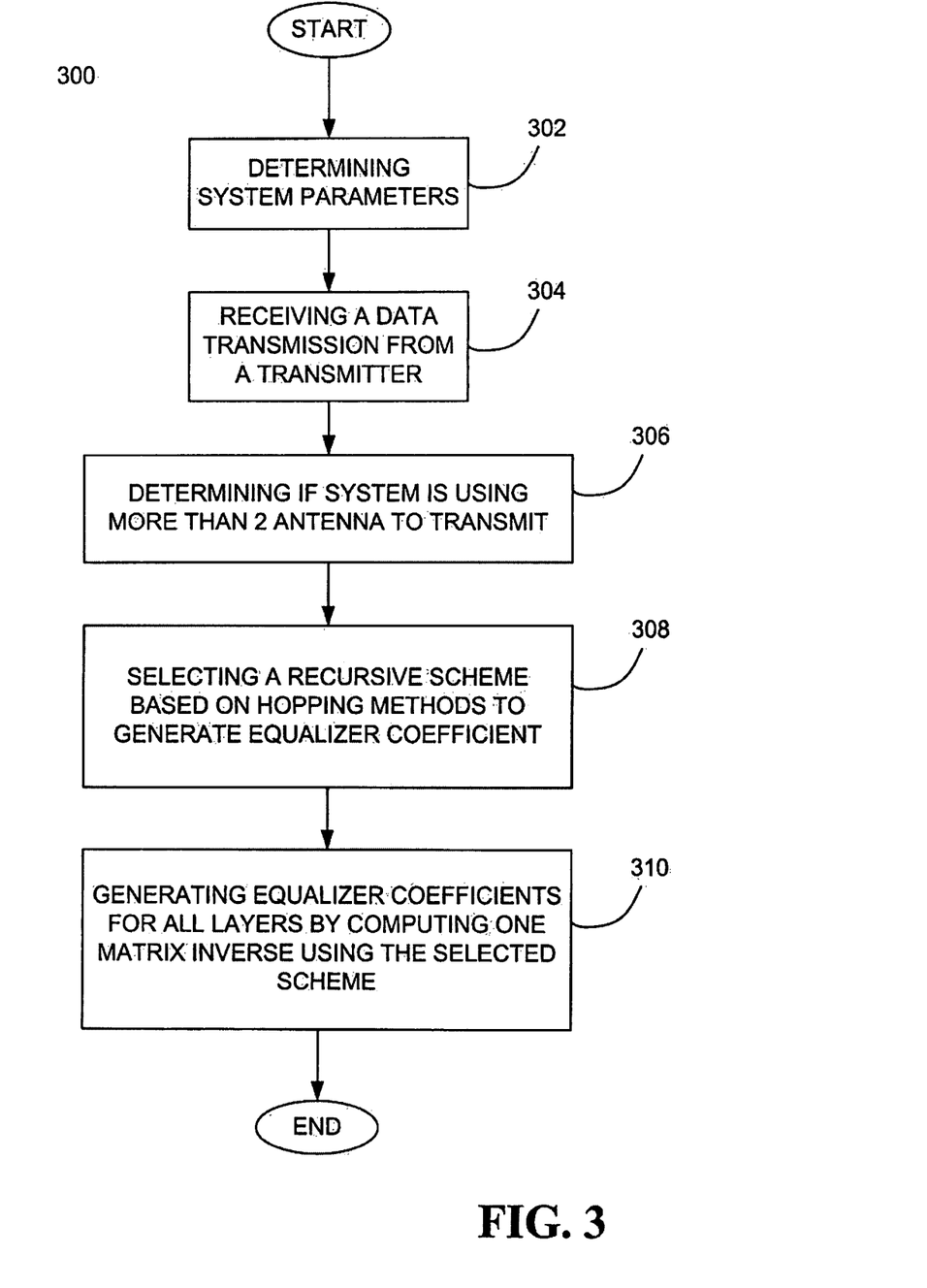
FIG. 3 is an illustration of an example methodology that facilitates a type of system employed by receiver in a wireless communications system.

Turning specifically to FIG. 3, a methodology 300 that facilitates deriving equalizer coefficients in a wireless communication system (for example, OFDM or OFDMA systems) is illustrated. The method can be employed by any suitable receiver that uses MMSE spatial techniques to separate data transmissions sent concurrently using multiple antennas during a symbol period. For example, method 300 can be employed by a base station or an access terminal that used MMSE spatial techniques. The method starts at 302, determining system parameter by accessing memory. When an access terminal registers with a serving access point or base station, set of information is exchanged. For example, the number of antennas used by the system for transmission or reception. Also, the number of antennas used per tone can be transmitted using a specified channel. The number of antenna used can change for each OFDM tone or symbol. The method moves to 304 for receiving data transmission from a transmitter. In an aspect, method moves to 306, where it is determined if more than two antennas are being employed for transmission. If more than 2 antennas are used for a particular transmission, then according to an aspect, the method employs a recursive technique to determine equalizer coefficients. At 308, if determined that the system is using more than two antennas, the method selects the modified Riccatti recursive scheme to generate equalizer coefficients based on type of hopping method used. According to an aspect, for symbol rate hopping, the method selects the first modified Riccatti recursive scheme and for block-hopping, the method selects the second modified Riccatti recursive scheme (both methods described above).

In an aspect, after selecting the recursive scheme, the method moves to 310, generate equalizer coefficient for all layers by computing one matrix inverse (described above) using the selected scheme. As an example, a MIMO system that uses 4 antennas may generate a matrix of 4×4 which requires a matrix inversion for 4 layers (one for 4×4 matrix inversion, one for 3×3 matrix inversion, one 2×2 matrix inversion and one for 1×1 matrix inversion). After determining the hopping method, using the modified Riccatti recursive scheme to perform a matrix inversion, the equalizer coefficients for all layers are computed concurrently. Similar method may be employed to generating coefficients for systems that may use more that 4 antennas.

Figure 4:
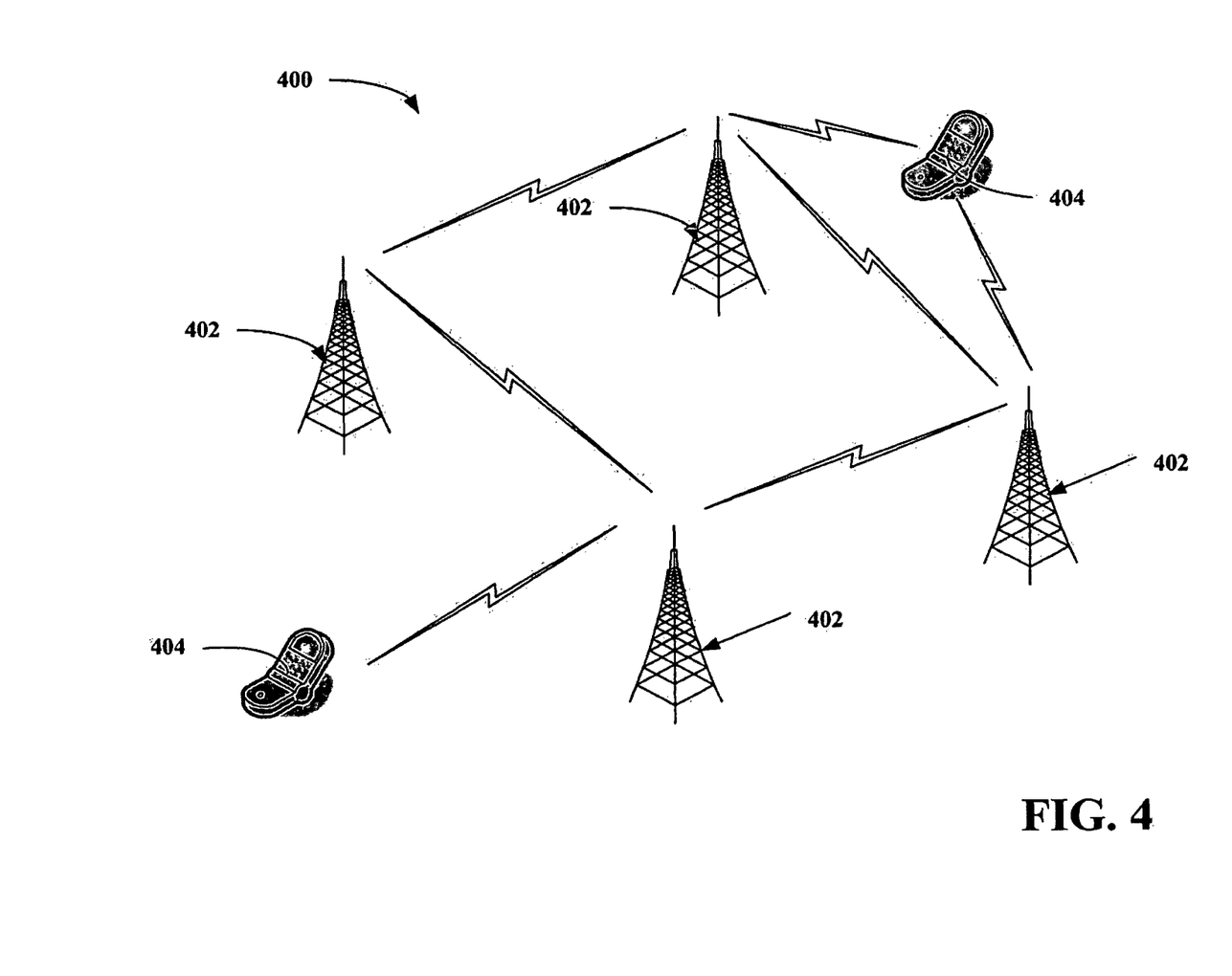
FIG. 4 illustrates a system that provides for other sector communication in accordance with one or more aspects presented herein.

Referring now to FIG. 4, a wireless communication system 400 is illustrated in accordance with various embodiments presented herein. System 400 can comprise one or more base stations 402 (e.g., access points) in one or more sectors that receive, transmit, repeat, etc., wireless communication signals to each other and/or to one or more mobile devices 404. Each base station 402 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 404 can be, for example, cellular phones, smart phones, laptops, handheld communication devices, handheld computing devices, satellite radios, global positioning systems, PDAs, and/or any other suitable device for communicating over wireless communication system 400.

Base stations 402 can broadcast content to mobile devices 404 by employing OFDM or OFDMA techniques. Frequency division based techniques such as OFDM typically separate the frequency spectrum into distinct channels; for instance, the frequency spectrum may be split into uniform chunks of bandwidth (frequency range). OFDM effectively partitions the overall system bandwidth into multiple orthogonal frequency channels. The frequency channels may use Sync or Async HARQ assignments, depending on the system requirements. Additionally, an OFDM system may use time and/or frequency division multiplexing to achieve orthogonality among multiple data transmissions for multiple base stations 402.

Figure 5:
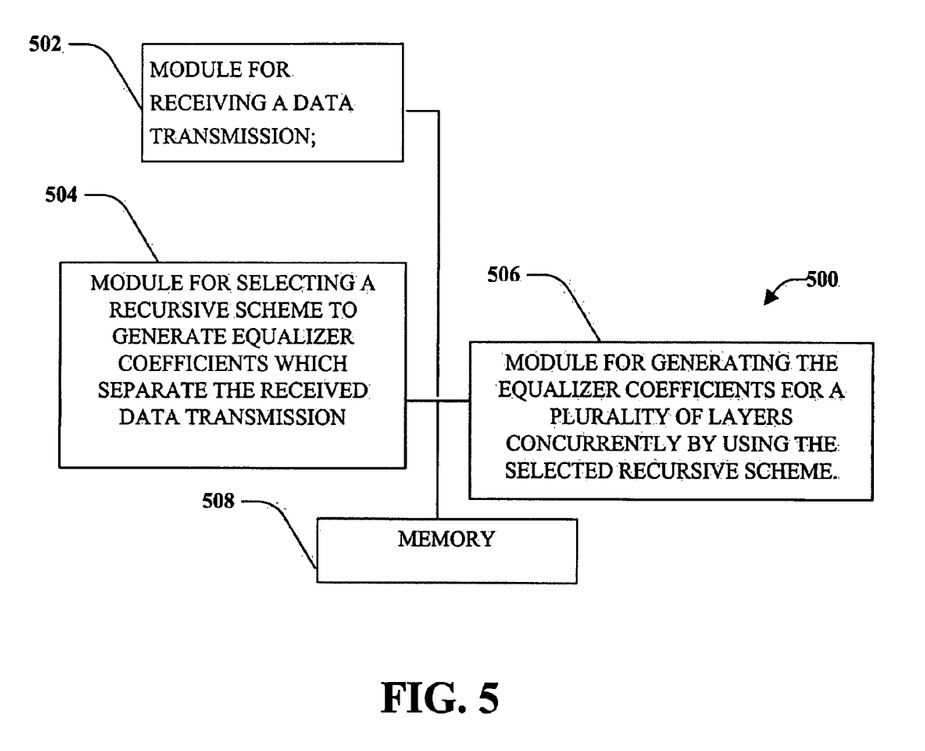
FIG. 5 illustrates a block diagram of modules to that carry out methodology in a wireless communication system.

Referring now to FIG. 5, a system 500 that facilitates deriving equalizer coefficients in a wireless communication is illustrated. System 500 may include a module 502 for receiving a data transmission, a module 504 for receiving selecting a recursive scheme and module 506 for generating the equalizer coefficients for plurality of layers concurrently. Modules 502, 504 and 506 may be a processor or any electronic device and may be coupled to memory module 508.

Figure 6:
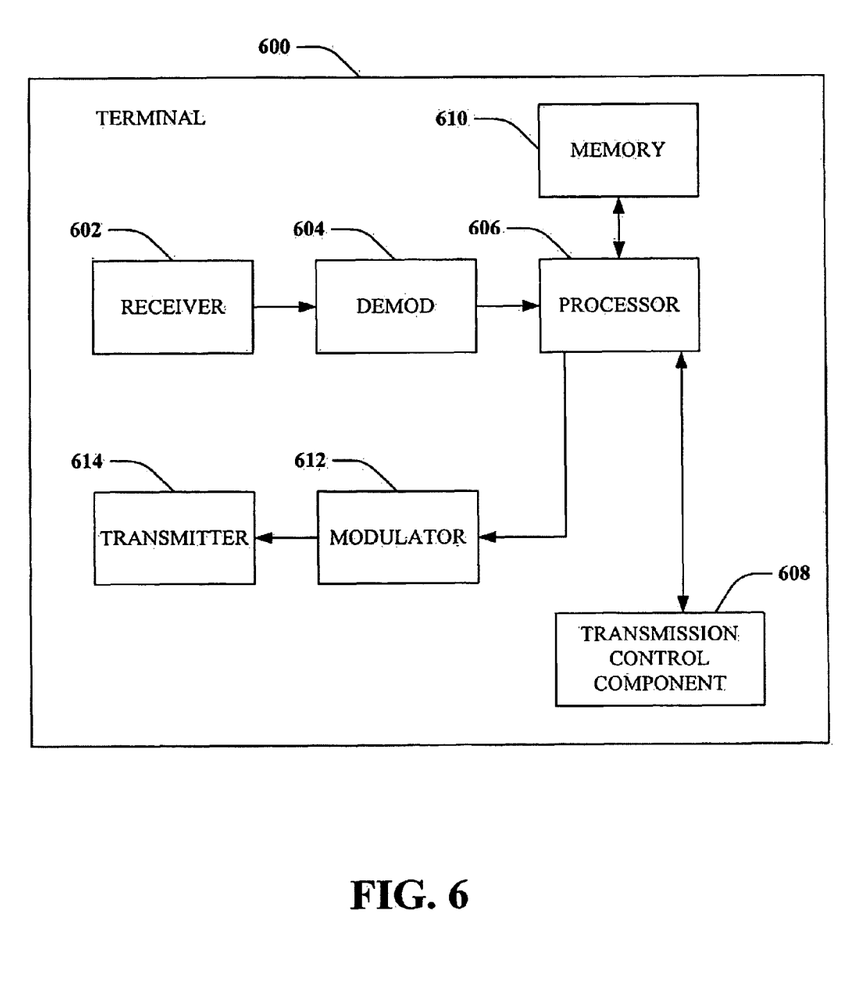
FIG. 6 is a block diagram of a system that facilitates a multiplexed downlink transmission according to mobile device capabilities.

FIG. 6 is an illustration of a terminal or user device 600 that provides for other sector communication in a wireless communication environment in accordance with one or more aspects set forth herein. Terminal 600 comprises a receiver 602 that receives a signal, for instance one or more receive antennas, and performs typical actions (e.g., filters, amplifies, downconverts, etc.) the received signal and digitizes the conditioned signal to obtain samples. A demodulator 604 can demodulate the samples and provide received pilot symbols to a processor 606.

Processor 606 can be a processor dedicated to analyzing information received by receiver component 602 and/or generating information for transmission by a transmitter 614. Processor 606 can be a processor that controls one or more components of terminal 600, and/or a processor that analyzes information received by receiver 602, generates information for transmission by a transmitter 614, and controls one or more components of terminal 600. Processor 606 can utilize any of the methodologies described herein, including those described with respect to FIGS. 2-3.

In addition, terminal 600 can include a transmission control component 608 that analyzes received input, including acknowledgements of successful transmissions. Acknowledgements (ACK) can be received from the serving sector and/or a neighboring sector. Acknowledgements can indicate that a previous transmission has been successfully received and decoded by one of the access points. If no acknowledgement is received, or if a negative acknowledgement (NAK) is received, the transmission can be resent. Transmission control component 608 can be incorporated into the processor 606. It is to be appreciated that transmission control component 608 can include transmission control code that performs analysis in connection with determining receipt of acknowledgement.

Terminal 600 can additionally comprise memory 610 that is operatively coupled to processor 606 and that can store information related to transmissions, an active set of sectors, methods for controlling transmissions, lookup tables comprising information related thereto, and any other suitable information related to transmissions and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 610 of the subject systems and methods is intended to comprise, without being limited to, these and any other suitable types of memory. Processor 606 is connected to a symbol modulator 612 and transmitter 614 that transmits the modulated signal.

Figure 7:
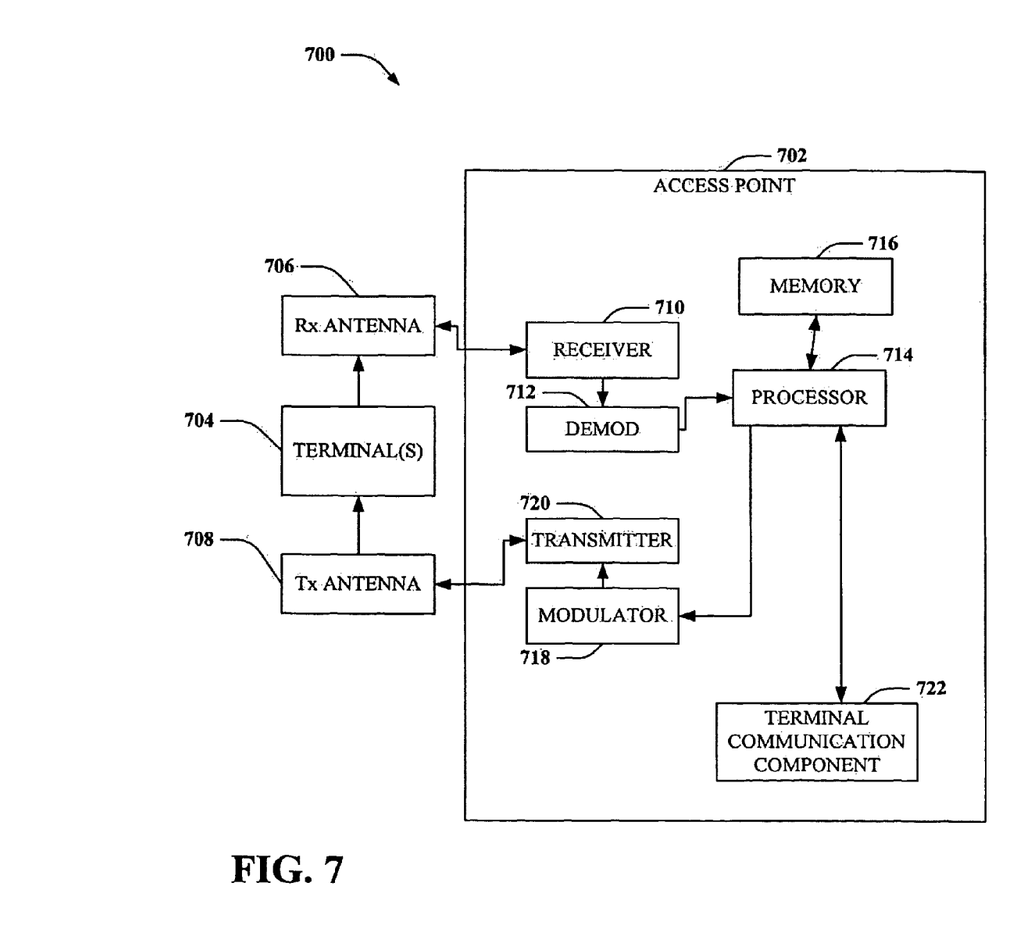
FIG. 7 is a block diagram of a system that facilitates a multiplexed downlink transmission according to mobile device capabilities.

FIG. 7 is an illustration of a system 700 that facilitates other sector communication in a communication environment in accordance with various aspects. System 700 comprises an access point 702 with a receiver 710 that receives signal(s) from one or more terminals 704 through one or more receive antennas 706, and transmits to the one or more terminals 704 through a plurality of transmit antennas 708. Terminals 704 can include those terminals supported by the access point 702, as well as terminals 704 supported by neighboring sectors. In one or more aspects, receive antennas 706 and transmit antennas 708 can be implemented using a single set of antennas. Receiver 710 can receive information from receive antennas 706 and is operatively associated with a demodulator 712 that demodulates received information. Receiver 710 can be, for example, a Rake receiver (e.g., a technique that individually processes multi-path signal components using a plurality of baseband correlators, . . . ), an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 714 that is similar to the processor described above with regard to FIG. 10, and is coupled to a memory 716 that stores information related to terminals, assigned resources associated with terminals and the like. Receiver output for each antenna can be jointly processed by receiver 710 and/or processor 714. A modulator 718 can multiplex the signal for transmission by a transmitter 720 through transmit antennas 708 to terminals 704.

Access point 702 further comprises a terminal communication component 722, which can be a processor distinct from, or integral to, processor 714. Terminal communication component 722 can obtain resource assignment information for terminals supported by neighboring sectors. In addition, terminal communication component 722 can provide assignment information to neighboring sectors for terminals supported by access point 702. Assignment information can be provided via backhaul signaling.

Based upon information regarding assigned resources, terminal communication component 722 can direct detection of transmissions from terminals supported by neighboring sectors, as well as decoding of received transmissions. Memory 716 can maintain packets received from terminals prior to receipt of the assignment information necessary for decoding of packets. Terminal communication component 722 can also control transmission and receipt of acknowledgments indicating successful reception and decoding of transmissions. It is to be appreciated that terminal communication component 722 can include transmission analysis code that performs utility based control in connection with assigning resources, identifying terminals for soft handoff, decoding transmissions and the like. The terminal analysis code can utilize artificial intelligence based methods in connection with performing inference and/or probabilistic determinations and/or statistical-based determinations in connection with optimizing terminal performance.

The techniques described herein may be implemented by various means. For example, these techniques may be implemented in hardware, software, or a combination thereof. For a hardware implementation, the processing units (e.g., TX processors 214, 220 and RX processors 260 and 270, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method in a wireless communication system that reduces computational overhead and complexity due to generation of equalizer coefficients for each SIC layer by separately computing individual matrix inverses, by automatically generating SIC equalizer coefficients for multiple layers, with minimal overhead complexity, comprising:

receiving a data transmission;

selecting a modified Riccatti Recursive scheme to perform a matrix inverse for generating equalizer coefficients to separate the received data transmission for systems with more than 2 transmit antennas ($M_T$>2); and generating the equalizer coefficients for a plurality of layers concurrently by using the said selected recursive scheme to eliminate the requirement of producing said matrix inverse for each layer separately; wherein the matrix inverse is evaluated using a first modified Riccatti recursion algorithm/scheme for symbol rate hopping, wherein the $M_T \times M_T$ is defined as:

$$P_{|ik} = \left[ \sum_{j=1}^{i} h_{jk}^* h_{jk} + \sigma^2 I \right]^{-1},$$

where $h_{jk}$ is the j-th row of $H_k$;

the processor uses a matrix inversion Lemma such that the recursion can be employed as, i=1, 2 ... $M_R$, wherein $$P_{|ik} = P_{|i-1,k} - \frac{P_{|i-1,k} h_{ik}^* h_{ik} P_{|i-1,k}}{1 + h_{ik} P_{|i-1,k} h_{ik}^*}$$

$$P_{|0} = \frac{1}{\sigma^2} I_{M_T \times M_T}; \text{ and}$$

wherein for each iteration, operations and associated complexity are evaluated as: $1^{st}$ Iteration:

| | |
|---|---|
| $\bar{a} = P_{|i-1} h_i^*$: | $2M_T$ RM |
| $b = h_i P_{|i-1} h_i^* = h_i \bar{a}$: | $4M_T$ RM, $2M_T$ RA, $2(M_T-1)$ RAcc |
| $\alpha = 1/(1+b)$: | Table-lookup reciprocal |
| $\bar{c} = \alpha \bar{a} = \frac{P_{|i-1} h_i^*}{1 + h_i P_{|i-1} h_i^*}$: | $2M_T$ RM |
| $\overline{cc}^* = \frac{P_{|i-1} h_i^* h_i P_{|i-1}}{1 + h_i P_{|i-1} h_i^*}$: | $2M_T(M_T+1)$ RM |
| $P_{|i}$ update: | $2M_T$ RA; and |

$2^{nd}$ Iteration Onwards:

| | |
|---|---|
| $\bar{a} = P_{|i-1} h_i^*$: | $4M_T^2$ RM, $2M_T^2$ RA, $2M_T(M_T-1)$ RAcc |
| $b = h_i P_{|i-1} h_i^* = h_i \bar{a}$: | $4M_T$ RM, $2M_T$ RA, $2(M_T-1)$ RAcc |
| $\alpha = 1/(1+b)$: | Table-lookup reciprocal |
| $\bar{c} = \alpha \bar{a} = \frac{P_{|i-1} h_i^*}{1 + h_i P_{|i-1} h_i^*}$: | $2M_T$ RM |
| $\overline{cc}^* = \frac{P_{|i-1} h_i^* h_i P_{|i-1}}{1 + h_i P_{|i-1} h_i^*}$: | $2M_T(M_T+1)$ RM |
| $P_{|i}$ update: | $2M_T^2$ RA. |

2. The method of claim 1, further comprising determining the number of antenna used for the data transmission.

3. The method of claim 1, wherein receiving the data transmission comprises of receiving the transmission at a receiver using minimum mean-squared error (MMSE) techniques.

4. The method of claim 1, wherein receiving the data transmission comprises receiving the transmission at an access point using minimum mean-squared error (MMSE) techniques.

5. The method of claim 1, wherein receiving the data transmission comprises receiving the transmission at an access terminal using minimum mean-squared error (MMSE) techniques.

6. The method of claim 1, wherein generating equalizer coefficients for the plurality of layers comprises generating the equalizer coefficients for all necessary layers based on number of antenna used by the system.

7. The method of claim 1, wherein generating equalizer coefficients for the plurality of layers comprises using one matrix inversion.

8. An apparatus, operable in a wireless communication system that reduces computational overhead and complexity due to generation of equalizer coefficients for each SIC layer by separately computing individual matrix inverses, by automatically generating SIC equalizer coefficients for multiple layers, with minimal overhead complexity, comprising:

means for receiving a data transmission;

means for selecting a modified Riccatti recursive scheme to perform a matrix inverse to generate equalizer coefficients which separate the received data transmission for systems with more than 2 transmit antennas ($M_T$>2); and means for generating the equalizer coefficients for plurality of layers concurrently by using the said selected recursive scheme to eliminate the requirement of producing said matrix inverse for each layer separately; wherein the matrix inverse is evaluated using a first modified Riccatti recursion algorithm/scheme for symbol rate hopping, wherein the $M_T \times M_T$ is defined as:

$$P_{|ik} = \left[ \sum_{j=1}^{i} h_{jk}^* h_{jk} + \sigma^2 I \right]^{-1},$$

where $h_{jk}$ is the j-th row of $H_k$;

the processor uses a matrix inversion Lemma such that the recursion can be employed as, i=1, 2 ... $M_R$, wherein $$P_{|ik} = P_{|i-1,k} - \frac{P_{|i-1,k} h_{ik}^* h_{ik} P_{|i-1,k}}{1 + h_{ik} P_{|i-1,k} h_{ik}^*}$$

$$P_{|0} = \frac{1}{\sigma^2} I_{M_T \times M_T}; \text{ and}$$

wherein for each iteration, operations and associated complexity are evaluated as: $1^{st}$ Iteration:

| | |
|---|---|
| $\bar{a} = P_{\|i-1}h_i^*$: | $2M_T$ RM |
| $b = h_i P_{\|i-1}h_i^* = h_i\bar{a}$: | $4M_T$ RM, $2M_T$ RA, $2(M_T-1)$ R_Acc |
| $\alpha = 1/(1+b)$: | Table-lookup reciprocal |
| $\bar{c} = \alpha\bar{a} = \dfrac{P_{\|i-1}h_i^*}{1+h_i P_{\|i-1}h_i^*}$: | $2M_T$ RM |
| $\overline{cc^*} = \dfrac{P_{\|i-1}h_i^* h_i P_{\|i-1}}{1+h_i P_{\|i-1}h_i^*}$: | $2M_T(M_T+1)$ RM |
| $P_{\|i}$ update: | $2M_T$ RA; and |

$2^{nd}$ Iteration Onwards:

| | |
|---|---|
| $\bar{a} = P_{\|i-1}h_i^*$: | $4M_T^2$ RM, $2M_T^2$ RA, $2M_T(M_T-1)$RAcc |
| $b = h_i P_{\|i-1}h_i^* = h_i\bar{a}$: | $4M_T$ RM, $2M_T$ RA, $2(M_T-1)$ RAcc |
| $\alpha = 1/(1+b)$: | Table-lookup reciprocal |
| $\bar{c} = \alpha\bar{a} = \dfrac{P_{\|i-1}h_i^*}{1+h_i P_{\|i-1}h_i^*}$: | $2M_T$ RM |
| $\overline{cc^*} = \dfrac{P_{\|i-1}h_i^* h_i P_{\|i-1}}{1+h_i P_{\|i-1}h_i^*}$: | $2M_T(M_T+1)$ RM |
| $P_{\|i}$ update: | $2M_T^2$ RA. |

9. The apparatus of claim 8, further comprising means for determining the number of antenna used for the data transmission.

10. The apparatus of claim 8, further comprising means for determining if the system used more than two antenna for the data transmission before the selecting the recursive scheme.

11. The apparatus of claim 8, wherein means for receiving the data transmission comprises of means for receiving the transmission at a receiver using minimum mean-squared error (MMSE) techniques.

12. The apparatus of claim 8, wherein means for receiving the data transmission comprises of means for receiving the transmission at an access point using minimum mean-squared error (MMSE) techniques.

13. The apparatus of claim 8, wherein means for receiving the data transmission comprises of means for receiving the transmission at an access terminal using minimum mean-squared error (MMSE) techniques.

14. The apparatus of claim 8, wherein means for generating equalizer coefficients for the plurality of layers comprises of means for generating the equalizer coefficients for all necessary layers based on number of antenna used by the system.

15. The apparatus of claim 8, wherein means for generating equalizer coefficients for the plurality of layers comprises of means of using one matrix inversion.

16. An apparatus that generates SIC equalizer coefficients comprising:
   at least one processor configured to carry out the following acts:
   if number of transmit antennas ($M_T$) used is greater than two, using a modified Riccatti Recursion to produce an inverse matrix for an N layer matrix (N being an integer>2); and concurrently generating inverse matrixe(s) for layers less than N; and
   a memory coupled to the at least one processor that stores computer executable code;
   wherein the matrix inverse is evaluated using a first modified Riccatti recursion algorithm/scheme for symbol rate hopping, wherein the $M_T \times M_T$ is defined as:

$$P_{\|ik} = \left[\sum_{j=1}^{i} h_{jk}^* h_{jk} + \sigma^2 I\right]^{-1},$$

where $h_{jk}$ is the j-th row of $H_k$;
   the processor uses a matrix inversion Lemma such that the recursion can be employed as, i=1, 2 ... $M_R$, wherein $$P_{\|ik} = P_{\|i-1,k} - \dfrac{P_{\|i-1,k}h_{ik}^* h_{ik} P_{\|i-1,k}}{1+h_{ik}P_{\|i-1,k}h_{ik}^*}$$

$$P_{\|0} = \dfrac{1}{\sigma^2} I_{M_T \times M_T}; \text{ and}$$

wherein for each iteration, operations and associated complexity are evaluated as: $1^{st}$ Iteration:

| | |
|---|---|
| $\bar{a} = P_{\|i-1}h_i^*$: | $2M_T$ RM |
| $b = h_i P_{\|i-1}h_i^* = h_i\bar{a}$: | $4M_T$ RM, $2M_T$ RA, $2(M_T-1)$ R_Acc |
| $\alpha = 1/(1+b)$: | Table-lookup reciprocal |
| $\bar{c} = \alpha\bar{a} = \dfrac{P_{\|i-1}h_i^*}{1+h_i P_{\|i-1}h_i^*}$: | $2M_T$ RM |
| $\overline{cc^*} = \dfrac{P_{\|i-1}h_i^* h_i P_{\|i-1}}{1+h_i P_{\|i-1}h_i^*}$: | $2M_T(M_T+1)$ RM |
| $P_{\|i}$ update: | $2M_T$ RA; and |

$2^{nd}$ Iteration Onwards:

| | |
|---|---|
| $\bar{a} = P_{\|i-1}h_i^*$: | $4M_T^2$ RM, $2M_T^2$ RA, $2M_T(M_T-1)$RAcc |
| $b = h_i P_{\|i-1}h_i^* = h_i\bar{a}$: | $4M_T$ RM, $2M_T$ RA, $2(M_T-1)$ RAcc |
| $\alpha = 1/(1+b)$: | Table-lookup reciprocal |
| $\bar{c} = \alpha\bar{a} = \dfrac{P_{\|i-1}h_i^*}{1+h_i P_{\|i-1}h_i^*}$: | $2M_T$ RM |
| $\overline{cc^*} = \dfrac{P_{\|i-1}h_i^* h_i P_{\|i-1}}{1+h_i P_{\|i-1}h_i^*}$: | $2M_T(M_T+1)$ RM |
| $P_{\|i}$ update: | $2M_T^2$ RA. |

17. A computer program product stored on a non-transitory medium that automatically generates SIC equalizer coefficients for multiple layers, with minimal overhead complexity, comprising:
   a non transitory computer readable medium having stored thereon computer executable code for causing at least one computer to carrying out the following acts:
   receiving a data transmission;
   selecting a modified Riccatti recursive scheme to perform a matrix inverse for generating equalizer coefficients to separate the received data transmission for systems with more than 2 transmit antennas ($M_T > 2$); and
   generating the equalizer coefficients for plurality of layers concurrently by using the selected recursive scheme to eliminate the requirement of producing said matrix inverse for each layer separately; wherein the matrix inverse is evaluated using a first modified Riccatti recursion algorithm/scheme for symbol rate hopping, wherein the $M_T \times M_T$ is defined as:

$$P_{|ik} = \left[\sum_{j=1}^{i} h_{jk}^* h_{jk} + \sigma^2 I\right]^{-1},$$

where $h_{jk}$ is the j-th row of $H_k$;

the processor uses a matrix inversion Lemma such that the recursion can be employed as, i=1, 2 ... $M_R$, wherein $$P_{|ik} = P_{|i-1,k} - \frac{P_{|i-1,k} h_{ik}^* h_{ik} P_{|i-1,k}}{1 + h_{ik} P_{|i-1,k} h_{ik}^*}$$

$$P_{|0} = \frac{1}{\sigma^2} I_{M_T \times M_T}; \text{ and}$$

wherein for each iteration, operations and associated complexity are evaluated as: $1^{st}$ Iteration:

| | |
|---|---|
| $\bar{a} = P_{\|i-1} h_i^*$: | $2M_T$ RM |
| $b = h_i P_{\|i-1} h_i^* = h_i \bar{a}$: | $4M_T$ RM, $2M_T$ RA, $2(M_T - 1)$ R_Acc |
| $\alpha = 1/(1+b)$: | Table-lookup reciprocal |
| $\bar{c} = \alpha \bar{a} = \dfrac{P_{\|i-1} h_i^*}{1 + h_i P_{\|i-1} h_i^*}$: | $2M_T$ RM |
| $\overline{cc^*} = \dfrac{P_{\|i-1} h_i^* h_i P_{\|i-1}}{1 + h_i P_{\|i-1} h_i^*}$: | $2M_T(M_T + 1)$ RM |
| $P_{\|i}$ update: | $2M_T$ RA; and |

$2^{nd}$ Iteration Onwards:

| | |
|---|---|
| $\bar{a} = P_{\|i-1} h_i^*$: | $4M_T^2$ RM, $2M_T^2$ RA, $2M_T(M_T-1)$RAcc |
| $b = h_i P_{\|i-1} h_i^* = h_i \bar{a}$: | $4M_T$ RM, $2M_T$ RA, $2(M_T - 1)$ RAcc |
| $\alpha = 1/(1+b)$: | Table-lookup reciprocal |
| $\bar{c} = \alpha \bar{a} = \dfrac{P_{\|i-1} h_i^*}{1 + h_i P_{\|i-1} h_i^*}$: | $2M_T$ RM |
| $\overline{cc^*} = \dfrac{P_{\|i-1} h_i^* h_i P_{\|i-1}}{1 + h_i P_{\|i-1} h_i^*}$: | $2M_T(M_T + 1)$ RM |
| $P_{\|i}$ update: | $2M_T^2$ RA. |

18. The computer program product of claim 17, wherein the computer readable medium further comprises computer executable code for causing the at least one computer to carrying out the following act:

determining the number of antenna used for the data transmission.

19. The computer program product of claim 18, wherein the computer readable medium further comprises computer executable code for causing the at least one computer to carrying out the following act:

determining if the system used more than two antenna for the data transmission before the selecting the recursive scheme.

20. The computer program product of claim 17, wherein receiving the data transmission comprises of receiving the transmission at a receiver using minimum mean-squared error (MMSE) techniques.

21. The computer program product of claim 17, wherein receiving the data transmission comprises receiving the transmission at an access point using minimum mean-squared error (MMSE) techniques.

22. The computer program product of claim 17, wherein receiving the data transmission comprises receiving the transmission at an access terminal using minimum mean-squared error (MMSE) techniques.

23. The computer program product of claim 17, wherein generating equalizer coefficients for the plurality of layers comprises generating the equalizer coefficients for all necessary layers based on number of antenna used by the system.

24. The computer program product of claim 17, wherein generating equalizer coefficients for the plurality of layers comprises using one matrix inversion.

\* \* \* \* \*